United States Patent
An et al.

(10) Patent No.: US 10,649,231 B2
(45) Date of Patent: May 12, 2020

(54) SWITCHABLE TYPE TOUCH DISPLAY DEVICE AND METHOD OF DRIVING THE SAME

(71) Applicant: LG Display Co., Ltd., Seoul (KR)

(72) Inventors: Chung-Hwan An, Seoul (KR); Chang-Ho Lee, Gyeonggi-do (KR); Keong-Jin Lee, Seoul (KR); Joo-Ah Kim, Seoul (KR); Tae-Young Heo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 168 days.

(21) Appl. No.: 15/637,611

(22) Filed: Jun. 29, 2017

(65) Prior Publication Data
US 2017/0299909 A1     Oct. 19, 2017

Related U.S. Application Data

(62) Division of application No. 14/506,831, filed on Oct. 6, 2014, now Pat. No. 9,753,318.

(30) Foreign Application Priority Data

Dec. 20, 2013 (KR) .................. 10-2013-0160404

(51) Int. Cl.
*G02B 30/27* (2020.01)
*H04N 13/305* (2018.01)
*G02F 1/1333* (2006.01)

(52) U.S. Cl.
CPC ......... *G02B 30/27* (2020.01); *G02F 1/13338* (2013.01); *H04N 13/305* (2018.05)

(58) Field of Classification Search
CPC . G02F 1/13338; G02B 27/2214; G02B 30/27; H04N 13/305
See application file for complete search history.

(56) References Cited

U.S. PATENT DOCUMENTS

| | | | |
|---|---|---|---|
| 2001/0026330 A1* | 10/2001 | Oh ................... | G02F 1/13338 349/12 |
| 2005/0280635 A1* | 12/2005 | Hinata ................ | G02F 1/1333 345/173 |
| 2009/0015737 A1 | 1/2009 | Jung et al. | |
| 2011/0096251 A1 | 4/2011 | Son | |

(Continued)

FOREIGN PATENT DOCUMENTS

| | | |
|---|---|---|
| KR | 10-2009-0006709 A | 1/2009 |
| KR | 10-2013-0064333 A | 6/2013 |
| KR | 10-2013-0125642 A | 11/2013 |

*Primary Examiner* — Thanh Nhan P Nguyen
(74) *Attorney, Agent, or Firm* — Morgan, Lewis & Bockius LLP

(57) ABSTRACT

A switchable type touch display device includes: a display panel displaying an image; a touch polarization control panel over the display panel, wherein the touch polarization control panel includes: first and second touch polarization control substrates; a first electrode on an inner surface of the first touch polarization control substrate; a second electrode on an inner surface of the second touch polarization control substrate; a third electrode on an outer surface of the second touch polarization control substrate; and a polarization control liquid crystal layer between the first and second touch polarization control substrates; and a lens panel over the touch polarization control panel.

17 Claims, 12 Drawing Sheets

(56) References Cited

U.S. PATENT DOCUMENTS

2011/0109622 A1    5/2011  Son
2012/0293759 A1*  11/2012  Kuo .................. G02B 27/2214
                                                          349/138
2013/0300705 A1   11/2013  Goo et al.
2014/0368624 A1*  12/2014  Na ..................... G02B 27/2214
                                                          348/54

* cited by examiner

SWITCHABLE TYPE TOUCH DISPLAY DEVICE AND METHOD OF DRIVING THE SAME

CROSS-REFERENCE TO RELATED APPLICATIONS

This application is a divisional of U.S. patent application Ser. No. 14/506,831, filed Oct. 6, 2014, and also claims the benefit of priority of Korean Patent Application No. 10-2013-0160404 filed on Dec. 20, 2013, both of which are hereby incorporated by reference for all purposes as if fully set forth herein.

BACKGROUND OF THE INVENTION

Field of the Invention

The present disclosure relates to a switchable type touch display device, and more particularly, to a switchable type touch display device where a thickness decreases and fabrication cost is reduced by forming an electrode for touch on a polarization control panel and a method of driving the same.

Discussion of the Related Art

Recently, a liquid crystal lens where a liquid crystal layer functions as a lens by using an optical anisotropic property of a liquid crystal molecule has been suggested, and a switchable type display device where a two-dimensional (2D) image or a three-dimensional (3D) image is selectively displayed by using a liquid crystal lens has been suggested. The switchable type display device includes a display panel, a polarization control panel and a lens panel.

In addition, a touch display device (or a touch screen) which is used as an output means for displaying an image and as an input means for receiving an order of a user by touching a portion of the displayed image, has been spotlighted. The touch display device includes a display panel and a touch panel.

Further, a switchable type touch display device which selectively displays a 2D image or a 3D image and receives an order of a user by applying the touch panel to the switchable type display device has been developed. The switchable type touch display device will be illustrated with reference to drawings.

FIGS. 1A and 1B are cross-sectional views showing optical paths of a switchable type touch display device in a 2D mode and a 3D mode, respectively, according to the related art.

In FIGS. 1A and 1B, a switchable type touch display device 10 includes a display panel 20, a polarization control panel 30, a lens panel 50 and a touch panel 60. The display panel 20 displays an image using a plurality of pixels including first to third pixels P1 to P3. The polarization control panel 30 includes first and second polarization control substrates 32 and 34 facing and spaced apart from each other and a polarization control liquid crystal layer 36 interposed between the first and second polarization control substrates 32 and 34. First and second polarization control electrodes 38 and 40 are formed on inner surfaces of the first and second polarization control substrates 32 and 34, respectively.

The lens panel 50 includes first and second lens substrates 52 and 54 facing each other and a lens liquid crystal layer 56 interposed between the first and second lens substrates 52 and 54. A plurality of concave portions each having a half cylindrical shape are formed on an inner surface of the second lens substrate 54 and are filled with the lens liquid crystal layer 56. In addition, a plurality of liquid crystal molecules 56a of the lens liquid crystal layer 56 are arranged such that a long axis of the liquid crystal molecule 56a is parallel to the plane of the paper (i.e., the cross-sectional plane). The liquid crystal molecule 56a has a birefringence property such that the liquid crystal molecule 56a has an ordinary refractive index $n_o$ and an extraordinary refractive index $n_e$ according to a propagation direction of light. Further, the second lens substrate 54 includes a material having the ordinary refractive index $n_o$ of the liquid crystal molecule 56a.

The touch panel 60 includes a touch substrate 62 and transmission and reception electrodes 64 and 66 formed on both surfaces, respectively, of the touch substrate 62. The touch panel 60 detects a touch position from a change in capacitance between the transmission and reception electrodes 64 and 66 generated according to a touch or not in a state where voltages are applied to the transmission and reception electrodes 64 and 66.

The switchable type touch display device 10 selectively displays a 2D image or a 3D image according to a polarization state of the polarization control panel 30. First to third lights L1 to L3 emitted from the first to third pixels P1 to P3, respectively, have a first polarization state PS1 where a polarization axis is parallel to the plane of the paper.

In a 2D mode where the 2D image is displayed as shown in FIG. 1A, since the first and second polarization control electrodes 38 and 40 have no voltage difference, an electric field is not generated between the first and second polarization control electrodes 38 and 40 of the polarization control panel 30. As a result, while the first to third lights L1 to L3 pass through the polarization control panel 30, the first to third lights L1 to L3 have a retardation of $\lambda/2$ (half wave). Accordingly, after the first to third lights L1 to L3 pass through the polarization control panel 30, the first to third lights L1 to L3 have a second polarization state SP2 where a polarization axis is perpendicular to the plane of the paper and enter the lens panel 50.

Since the liquid crystal molecule 56a of the lens liquid crystal layer 56 has a long axis parallel to the plane of the paper, the first to third lights L1 to L3 of the second polarization state PS2 feel that the lens liquid crystal layer 56 has the ordinary refractive index $n_o$. As a result, the first to third lights L1 to L3 of the second polarization state PS2 feel no refractive index difference at an interface between the lens liquid crystal layer 56 and the second lens substrate 54. Accordingly, the first to third lights L1 to L3 of the second polarization state PS2 straightly pass through the lens panel 50 without refraction so that the switchable touch display device 10 can display the 2D image.

In a 3D mode where the 3D image is displayed as shown in FIG. 1B, since the first and second polarization control electrodes 38 and 40 have a voltage difference, an electric field is generated between the first and second polarization control electrodes 38 and 40 of the polarization control panel 30. As a result, while the first to third lights L1 to L3 pass through the polarization control panel 30, the first to third lights L1 to L3 have no retardation. Accordingly, after the first to third lights L1 to L3 pass through the polarization control panel 30, the first to third lights L1 to L3 still have the first polarization state SP1 and enter the lens panel 50.

The first to third lights L1 to L3 of the first polarization state PS1 feel that the lens liquid crystal layer 56 has the extraordinary refractive index $n_e$. As a result, the first to third lights L1 to L3 of the first polarization state PS1 feel a refractive index difference at the interface between the lens liquid crystal layer 56 and the second lens substrate 54. Accordingly, the first to third lights L1 to L3 of the first polarization state PS1 are refracted while passing through the lens panel 50 so that the switchable touch display device 10 can display the 3D image.

In the switchable type touch display device according to the related art, since the touch panel for detecting touch as well as the polarization control panel for switching are required, a total thickness of the switchable type touch display device increases and fabrication cost increases according to complicated fabrication process. In addition, since there exists a limit in capacity and life time of a battery due to increase of power consumption for driving the display panel, the polarization control panel and the touch panel, it is difficult to apply the switchable type touch display device to a mobile device. Further, it is difficult to apply the switchable type touch display device to a partial 2D/3D display where a part such as an icon and a text is displayed as the 2D image and the other part such as a moving picture is displayed as the 3D image.

SUMMARY OF THE INVENTION

Accordingly, the present invention is directed to a switchable type touch display device and a method of driving the same that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, a switchable type touch display device includes: a display panel displaying an image; a touch polarization control panel over the display panel, wherein the touch polarization control panel includes: first and second touch polarization control substrates facing and spaced apart from each other; a first electrode on an inner surface of the first touch polarization control substrate; a second electrode on an inner surface of the second touch polarization control substrate, the second electrode having a shape of a plurality of bars parallel to and spaced apart from each other; a third electrode on an outer surface of the second touch polarization control substrate, the third electrode having a shape of a plurality of bars parallel to and spaced apart from each other, and the third electrode crossing the second electrode; and a polarization control liquid crystal layer between the first and second touch polarization control substrates; and a lens panel over the touch polarization control panel, wherein the lens panel refracts or straightly transmits a light passing through the touch polarization control panel according to a polarization state of the light.

In another aspect, a switchable type touch display device includes: a display panel displaying an image; a touch polarization control panel over the display panel, wherein the touch polarization control panel includes: first and second touch polarization control substrates facing and spaced apart from each other; a first electrode on an inner surface of the first touch polarization control substrate, the first electrode having a shape of a plurality of bars parallel to and spaced apart from each other; a second electrode on an inner surface of the second touch polarization control substrate, the second electrode having a shape of a plurality of bars parallel to and spaced apart from each other, and the second electrode crossing the first electrode; and a polarization control liquid crystal layer between the first and second touch polarization control substrates; and a lens panel over the touch polarization control panel, wherein the lens panel refracts or straightly transmits a light passing through the touch polarization control panel according to a polarization state of the light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the preferred embodiments, examples of which are illustrated in the accompanying drawings.

Figure 1A:
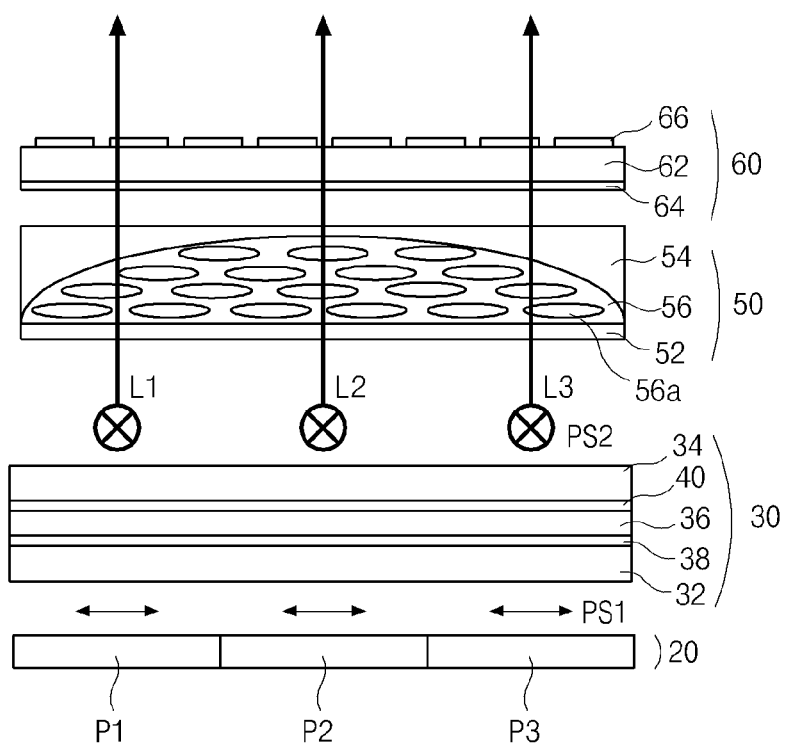
FIGS. 1A and 1B are cross-sectional views showing optical paths of a switchable type touch display device in a 2D mode and a 3D mode, respectively, according to the related art.
Figure 1B:
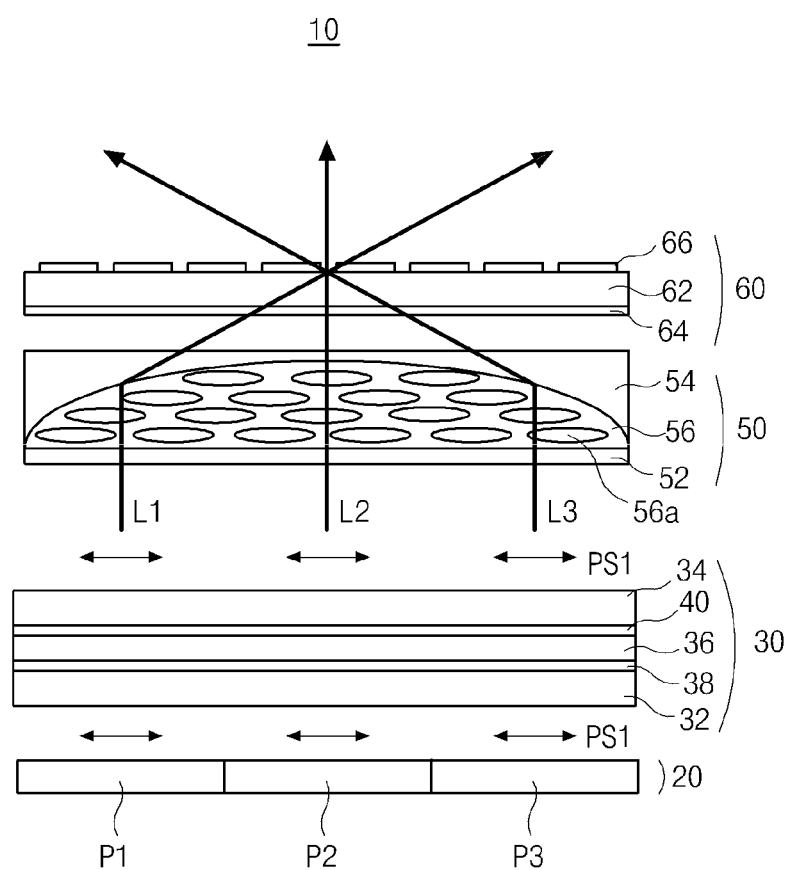
Figure 2:
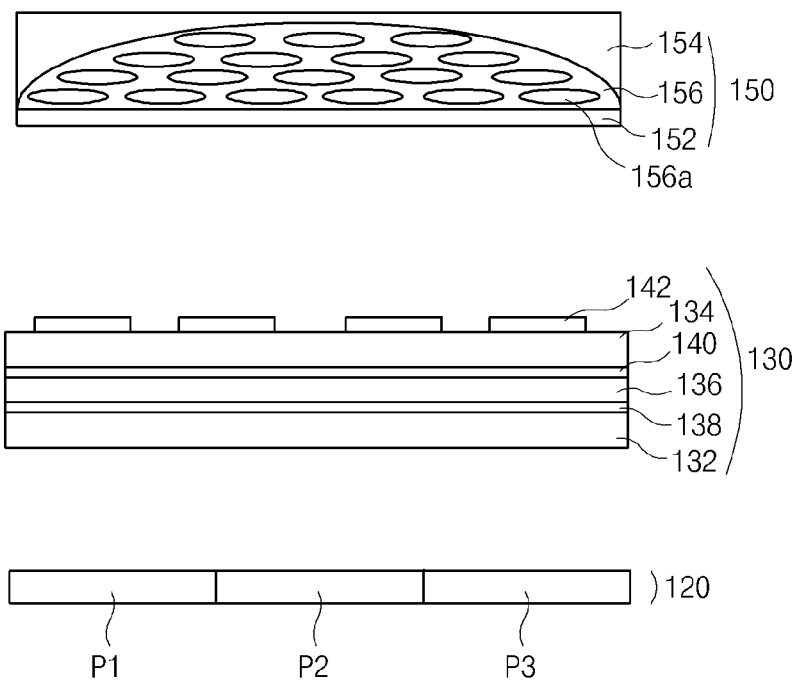
FIG. 2 is a cross-sectional view showing a switchable type touch display device according to a first embodiment of the present invention.
Figure 3:
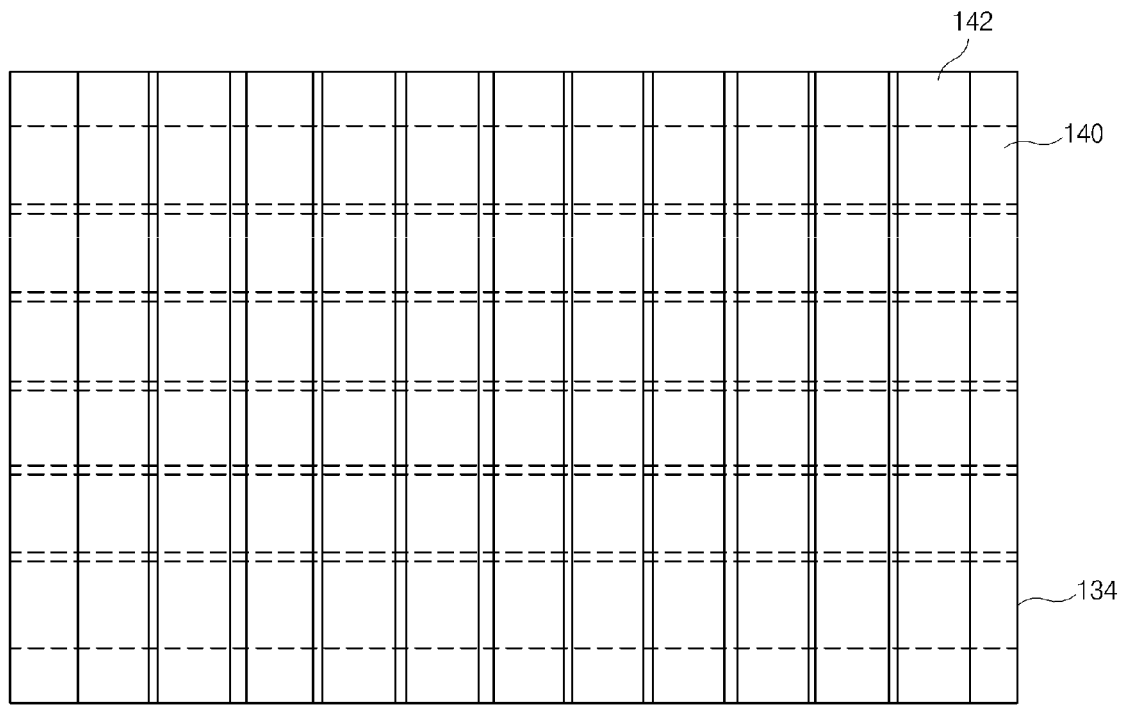
FIG. 3 is a plan view showing a touch polarization control panel of a switchable type touch display device according to a first embodiment of the present invention.

FIG. 2 is a cross-sectional view showing a switchable type touch display device according to a first embodiment of the present invention and FIG. 3 is a plan view showing a touch polarization control panel of a switchable type touch display device according to a first embodiment of the present invention.

In FIGS. 2 and 3, a switchable type touch display device 110 according to a first embodiment of the present invention includes a display panel 120, a touch polarization control panel 130 and a lens panel 150. The display panel 120 displays an image using a plurality of pixels including first to third pixels P1 to P3. When a two-dimensional (2D) image is displayed by the switchable touch display device 110, the plurality of pixels may display a single image. In addition, when a three-dimensional (3D) image is displayed by the switchable type touch display device 110, the plurality of pixels may be classified into a plurality of groups corresponding to a plurality of viewing zones and the plurality of pixels of each group may display a partial image corresponding to each viewing zone and constituting a single image.

The touch polarization control panel 130 selectively maintains or changes a polarization state of a light emitted from the display panel 120. The touch polarization control panel 130 may include first and second touch polarization control substrates 132 and 134 facing and spaced apart from each other and a polarization control liquid crystal layer 136 interposed between the first and second touch polarization control substrates 132 and 134.

First and second electrodes 138 and 140 are formed on inner surfaces of the first and second touch polarization control substrate 132 and 134, respectively, and a third electrode 142 is formed on an outer surface of the second touch polarization control substrate 134. The first electrode 138 may have a plate shape formed on the entire inner surface of the first touch polarization control substrate 132, and each of the second and third electrodes 140 and 142 may have a shape of a plurality of bars which are parallel to and spaced apart from each other. In addition, the second and third electrodes 140 and 142 may cross each other to constitute a capacitor.

The lens panel 150 refracts or straightly transmits the light passing through the touch polarization control panel 130 according to the polarization state of the light. The lens panel 150 may include first and second lens substrates 152 and 154 facing each other and a lens liquid crystal layer 156 interposed between the first and second lens substrates 152 and 154. A plurality of concave portions each having a half cylindrical shape may be formed on an inner surface of the second lens substrate 154 and may be filled with the lens liquid crystal layer 156.

In addition, a plurality of liquid crystal molecules 156a of the lens liquid crystal layer 156 may be arranged such that a long axis of the liquid crystal molecule 156a is parallel to the plane of the paper (i.e., the cross-sectional plane). The liquid crystal molecule 156a may have a birefringence property such that the liquid crystal molecule 156a has an ordinary refractive index $n_o$ and an extraordinary refractive index $n_e$ according to a propagation direction of light. Further, the second lens substrate 154 may include a material having a refractive index the same as the ordinary refractive index $n_o$ of the liquid crystal molecule 156a.

In another embodiment, the long axis of the liquid crystal molecule 156a may be disposed to be perpendicular to the plane of the paper, and the second lens substrate 154 may include a material having a refractive index the same as the extraordinary refractive index $n_o$ of the liquid crystal molecule 156a.

The switchable touch display device 110 may selectively display one of a 2D image and a 3D image according to a polarization state of the touch polarization control panel 130 and may detect a touch position from a change in capacitance between the second and third electrodes 140 and 142 generated according to a touch or not in a state where voltages are applied to the second and third electrodes 140 and 142 of the touch polarization control panel 130.

A method of driving the switchable touch display device 110 will be illustrated with reference to drawings.

Figure 4A:
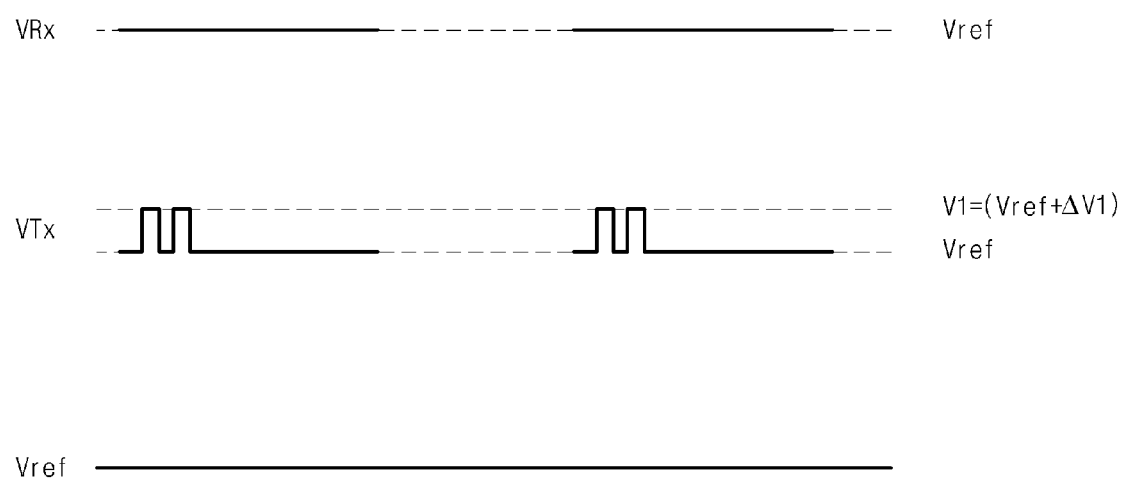
FIGS. 4A and 4B are timing charts showing signals used for displaying a 2D image and 3D image, respectively, in a switchable touch display device according to a first embodiment of the present invention.
Figure 4B:
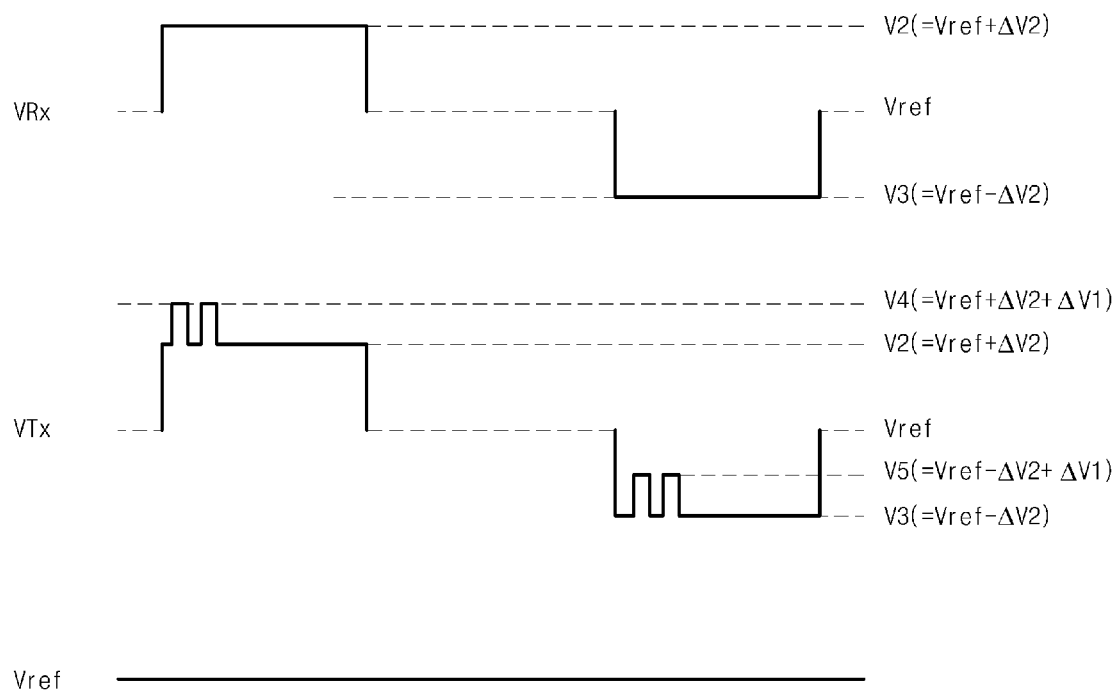

FIGS. 4A and 4B are timing charts showing signals used for displaying a 2D image and 3D image, respectively, in a switchable touch display device according to a first embodiment of the present invention.

In FIGS. 2, 4A and 4B, a reference voltage Vref, a transmission voltage VTx and a reception voltage VRx are applied to the first, second and third electrodes 138, 140 and 142, respectively, of the touch polarization control panel 130 of the switchable touch display device 110.

As shown in FIGS. 2 and 4A, when the touch display device 110 displays the 2D image, the transmission voltage VTx may be one of the reference voltage Vref and a first voltage V1 for detecting a touch. The first voltage V1 may have a square wave which is greater than the reference voltage Vref by a first voltage difference $\Delta V1$ (V1=Vref+$\Delta V1$). The transmission voltage VTx may have a waveform such that the first voltage difference $\Delta V1$ is added to the reference voltage Vref.

The first voltage V1 may be applied during a partial time period of a frame which is a unit time period for displaying an image. For example, the first voltage V1 may be applied during a time period of about 1/1000 to about 1/10000 of a single frame. In addition, the first voltage V1 may be applied periodically with a frequency of about 100 Hz to about 100 kHz. The reception voltage VRx may be the reference voltage Vref.

As a result, the reference voltage Vref is applied to the second electrode 140 during most of a single frame, and the first voltage V1 is applied to the second electrode 140 during the other partial time period of the single frame. Since an electric field is not generated between the first and second electrodes 138 and 140 during the most of the single frame, a light from the display panel 120 having a first polarization state where a polarization axis is parallel to the plane of the paper (i.e., a cross-sectional plane) may have a retardation of λ/2 (half wave) while passing through the polarization control liquid crystal layer 136. Accordingly, after the light passes through the polarization control liquid crystal layer 136, the light may have a second polarization state where a polarization axis is perpendicular to the plane of the paper and may enter the lens panel 150.

Since the liquid crystal molecule 156a of the lens liquid crystal layer 156 has a long axis parallel to the plane of the paper, the light of the second polarization state may feel that the lens liquid crystal layer 156 has the ordinary refractive index $n_o$. As a result, the light of the second polarization state may feel no refractive index difference at an interface between the lens liquid crystal layer 156 and the second lens substrate 154. Accordingly, the light of the second polarization state may straightly pass through the lens panel 150 without refraction so that the switchable touch display device 110 can display the 2D image.

Further, since the transmission voltage VTx of the first voltage V1 and the reception voltage VRx of the reference voltage Vref are applied to the second and third electrodes 140 and 142, respectively, a capacitor is constituted between the second and third electrodes 140 and 142 due to the first voltage difference ΔV1. Since a capacitance of the capacitor between the second and third electrodes 140 and 142 changes according to a touch or not, the touch position may be detected by measuring a change in capacitance.

As shown in FIGS. 2 and 4B, when the touch display device 110 displays the 3D image, the transmission voltage VTx may be one of second and third voltages V2 and V3 for controlling polarization and fourth and fifth voltages V4 and V5 for detecting a touch. The second voltage V2 may have a square wave which is greater than the reference voltage Vref by a second voltage difference ΔV2 (V2=Vref+ΔV2) and the third voltage V3 may have a square wave which is smaller than the reference voltage Vref by the second voltage difference ΔV2 (V3=Vref−ΔV2). In addition, the fourth voltage V4 may have a square wave which is greater than the second voltage V2 by the first voltage difference ΔV1 (V4=V2+ΔV1=Vref+ΔV2+ΔV1) and the fifth voltage V5 may have a square wave which is greater than the third voltage V3 by the first voltage difference ΔV1 (V5=V3+ΔV1=Vref−ΔV2+ΔV1). The transmission voltage VTx may have a waveform such that the first voltage difference ΔV1 is added to the second and third voltages V2 and V3, respectively.

The second and third voltages V2 and V3 may be alternately applied during a frame which is a unit time period for displaying an image to have equal magnitudes and opposite potentials with respect to the reference voltage Vref. In addition, the fourth and fifth voltages V4 and V5 may be applied during a partial time period of a frame. For example, each of the fourth and fifth voltages V4 and V5 may be applied during a time period of about ⅟1000 to about ⅟10000 of a single frame. Further, each of the fourth and fifth voltages V4 and V5 may be applied periodically with a frequency of about 100 Hz to about 100 kHz.

The reception voltage VRx may be one of the second and third voltages V2 and V3 that are alternately applied during a frame to have equal magnitudes and opposite potentials with respect to the reference voltage Vref.

As a result, one of the second and third voltages V2 and V3 is applied to the second electrode 140 during most of a single frame, and one of the fourth and fifth voltages V4 and V5 is applied to the second electrode 140 during the other partial time period of the single frame. Since an electric field is generated between the first and second electrodes 138 and 140 due to the second voltage difference ΔV2 during the most of the single frame, a light from the display panel 120 having a first polarization state where a polarization axis is parallel to the plane of the paper (i.e., a cross-sectional plane) may have no retardation while passing through the polarization control liquid crystal layer 136. Accordingly, after the light passes through the polarization control liquid crystal layer 136, the light may still have the first polarization state and may enter the lens panel 150.

Since the liquid crystal molecule 156a of the lens liquid crystal layer 156 has a long axis parallel to the plane of the paper, the light of the first polarization state may feel that the lens liquid crystal layer 156 has the extraordinary refractive index $n_e$. As a result, the light of the first polarization state may feel a refractive index difference at an interface between the lens liquid crystal layer 156 and the second lens substrate 154. Accordingly, the light of the first polarization state may be refracted while passing through the lens panel 150 so that the switchable touch display device 110 can display the 3D image.

Further, since the transmission voltage VTx of the fourth and fifth voltages V4 and V5 and the reception voltage VRx of the second and third voltages V2 and V3 are applied to the second and third electrodes 140 and 142, respectively, a capacitor is constituted between the second and third electrodes 140 and 142 due to the first voltage difference ΔV1. Since a capacitance of the capacitor between the second and third electrodes 140 and 142 changes according to a touch or not, the touch position may be detected by measuring a change in capacitance.

In the switchable touch display device 110 according to the first embodiment, the 2D image is displayed when the first and second electrodes 138 and 140 have no voltage difference, and the 3D image is displayed when the first and second electrodes 138 and 140 have a voltage difference. In another embodiment, the 3D image may be displayed when the first and second electrodes 138 and 140 have no voltage difference, and the 2D image may be displayed when the first and second electrodes 138 and 140 have a voltage difference by adjusting an alignment direction of the lens liquid crystal layer 156 of the lens panel 150 and adjusting a refractive index of the second lens substrate 154 of the lens panel 150.

Although a touch is detected and polarization is controlled by the three electrodes of the touch polarization control panel 130 in the switchable type touch display device 110 according to the first embodiment, the touch polarization control panel may include two electrodes in another embodiment.

Figures 5, 6A:
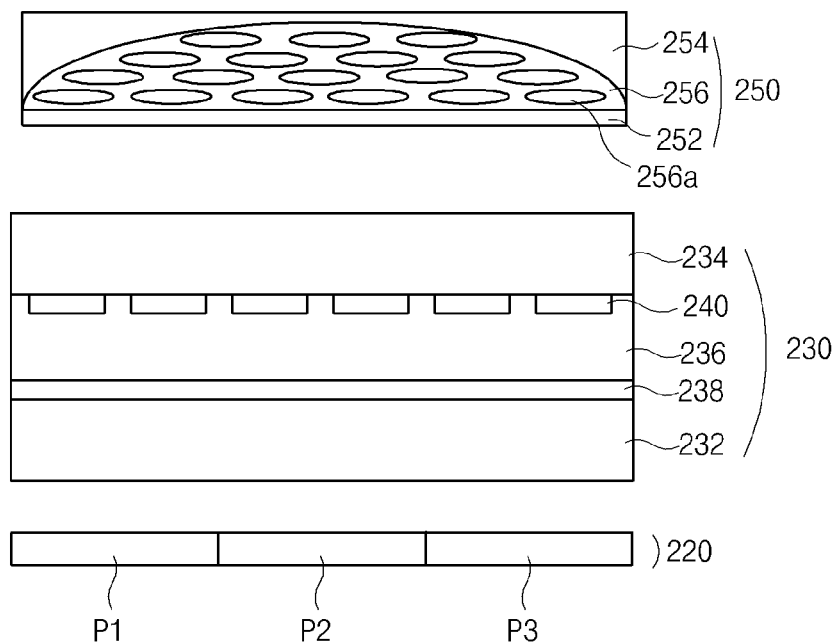
FIG. 5 is a cross-sectional view showing a switchable type touch display device according to a second embodiment of the present invention.
FIGS. 6A and 6B are timing charts showing signals used for displaying a 2D image and a 3D image, respectively, in a switchable touch display device according to a second embodiment of the present invention.

FIG. 5 is a cross-sectional view showing a switchable type touch display device according to a second embodiment of the present invention.

In FIG. 5, a switchable type touch display device 210 according to a second embodiment of the present invention includes a display panel 220, a touch polarization control panel 230 and a lens panel 250. The display panel 220 displays an image using a plurality of pixels including first to third pixels P1 to P3. When a two-dimensional (2D) image is displayed by the switchable touch display device 210, the plurality of pixels may display a single image. In addition, when a three-dimensional (3D) image is displayed by the switchable type touch display device 210, the plurality of pixels may be classified into a plurality of groups corresponding to a plurality of viewing zones and the plurality of pixels of each group may display a partial image corresponding to each viewing zone and constituting a single image.

The touch polarization control panel 230 selectively maintains or changes a polarization state of a light emitted from the display panel 220. The touch polarization control panel 230 may include first and second touch polarization control substrates 232 and 234 facing and spaced apart from each other and a polarization control liquid crystal layer 236 interposed between the first and second touch polarization control substrates 232 and 234.

First and second electrodes 238 and 240 are formed on inner surfaces of the first and second touch polarization control substrate 232 and 234, respectively. Each of the first and second electrodes 238 and 240 may have a shape of a plurality of bars which are parallel to and spaced apart from each other. Further, the plurality of bars may have the same width and the same gap space as each other. In addition, the first and second electrodes 238 and 240 may cross each other to constitute a capacitor.

The lens panel 250 refracts or straightly transmits the light passing through the touch polarization control panel 230 according to the polarization state of the light. The lens panel 250 may include first and second lens substrates 252 and 254 facing each other and a lens liquid crystal layer 256 interposed between the first and second lens substrates 252 and 254. A plurality of concave portions each having a half cylindrical shape may be formed on an inner surface of the second lens substrate 254 and may be filled with the lens liquid crystal layer 256.

In addition, a plurality of liquid crystal molecules 256a of the lens liquid crystal layer 256 may be arranged such that a long axis of the liquid crystal molecule 256a is parallel to the plane of the paper (i.e., the cross-sectional plane). The liquid crystal molecule 256a may have a birefringence property such that the liquid crystal molecule 256a has an ordinary refractive index $n_o$ and an extraordinary refractive index $n_e$ according to a propagation direction of light. Further, the second lens substrate 254 may include a material having a refractive index the same as the ordinary refractive index $n_o$ of the liquid crystal molecule 256a.

In another embodiment, the long axis of the liquid crystal molecule 256a may be disposed to be perpendicular to the plane of the paper, and the second lens substrate 254 may include a material having a refractive index the same as the extraordinary refractive index $n_e$ of the liquid crystal molecule 256a.

The switchable touch display device 210 may selectively display one of a 2D image and a 3D image according to a polarization state of the touch polarization control panel 230 and may detect a touch position from a change in capacitance between the first and second electrodes 238 and 240 generated according to a touch or not in a state where voltages are applied to the first and second electrodes 238 and 240 of the touch polarization control panel 230.

A method of driving the switchable touch display device 210 will be illustrated with reference to drawings.

Figure 6B:
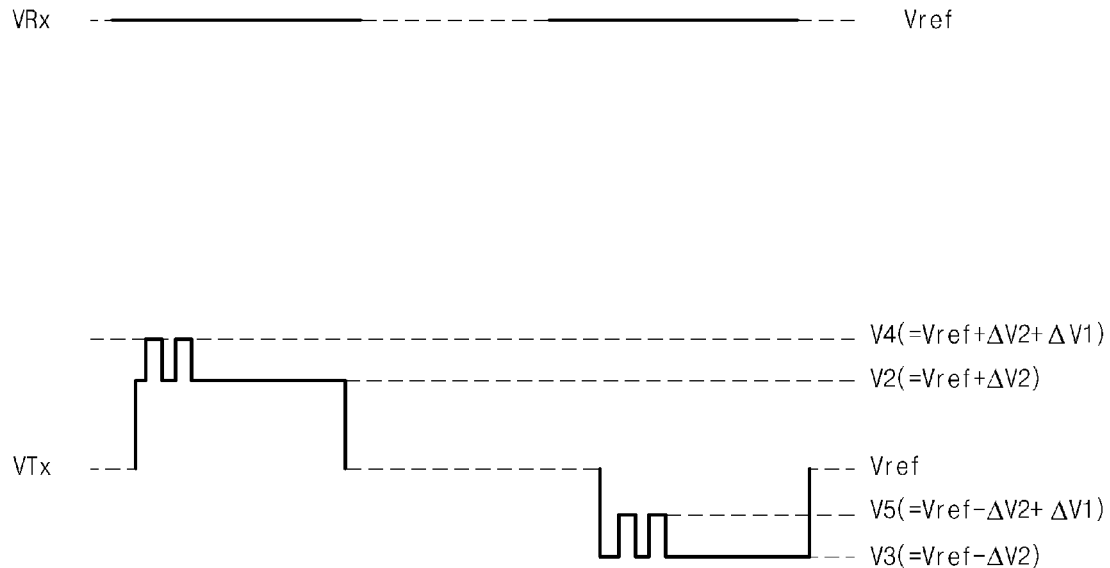

FIGS. 6A and 6B are timing charts showing signals used for displaying a 2D image and a 3D image, respectively, in a switchable touch display device according to a second embodiment of the present invention.

In FIGS. 5, 6A and 6B, a transmission voltage VTx and a reception voltage VRx are applied to the first and second electrodes 238 and 240, respectively, of the touch polarization control panel 230 of the switchable touch display device 210.

As shown in FIGS. 5 and 6A, when the touch display device 210 displays the 2D image, the transmission voltage VTx may be one of a reference voltage Vref and a first voltage V1 for detecting a touch. The first voltage V1 may have a square wave which is greater than the reference voltage Vref by a first voltage difference ΔV1 (V1=Vref+ΔV1). The transmission voltage VTx may have a waveform such that the first voltage difference ΔV1 is added to the reference voltage Vref.

The first voltage V1 may be applied during a partial time period of a frame which is a unit time period for displaying an image. For example, the first voltage V1 may be applied during a time period of about 1/1000 to about 1/10000 of a single frame. In addition, the first voltage V1 may be applied periodically with a frequency of about 100 Hz to about 100 kHz. The reception voltage VRx may be the reference voltage Vref.

As a result, the reference voltage Vref is applied to the first electrode 238 during most of a single frame, and the first voltage V1 is applied to the first electrode 238 during the other partial time period of the single frame. Since an electric field is not generated between the first and second electrodes 238 and 240 during the most of the single frame, a light from the display panel 220 having a first polarization state where a polarization axis is parallel to the plane of the paper (i.e., a cross-sectional plane) may have a retardation of 212 (half wave) while passing through the polarization control liquid crystal layer 236. Accordingly, after the light passes through the polarization control liquid crystal layer 236, the light may have a second polarization state where a polarization axis is perpendicular to the plane of the paper and may enter the lens panel 250.

Since the liquid crystal molecule 256a of the lens liquid crystal layer 256 has a long axis parallel to the plane of the paper, the light of the second polarization state may feel that the lens liquid crystal layer 256 has the ordinary refractive index $n_o$. As a result, the light of the second polarization state may feel no refractive index difference at an interface between the lens liquid crystal layer 256 and the second lens substrate 254. Accordingly, the light of the second polarization state may straightly pass through the lens panel 250 without refraction so that the switchable touch display device 210 can display the 2D image.

Further, since the transmission voltage VTx of the first voltage V1 and the reception voltage VRx of the reference voltage Vref are applied to the first and second electrodes 238 and 240, respectively, a capacitor is constituted between the first and second electrodes 238 and 240 due to the first voltage difference ΔV1. Since a capacitance of the capacitor between the first and second electrodes 238 and 240 changes according to a touch or not, the touch position may be detected by measuring a change in capacitance.

As shown in FIGS. 5 and 6B, when the touch display device 210 displays the 3D image, the transmission voltage VTx may be one of second and third voltages V2 and V3 for controlling polarization and fourth and fifth voltages V4 and V5 for detecting a touch. The second voltage V2 may have a square wave which is greater than the reference voltage Vref by a second voltage difference ΔV2 (V2=Vref+ΔV2) and the third voltage V3 may have a square wave which is smaller than the reference voltage Vref by the second voltage difference ΔV2 (V3=Vref−ΔV2). In addition, the fourth voltage V4 may have a square wave which is greater than the second voltage V2 by the first voltage difference ΔV1 (V4=V2+ΔV1=Vref+ΔV2+ΔV1) and the fifth voltage V5 may have a square wave which is greater than the third voltage V3 by the first voltage difference ΔV1 (V5=V3+ΔV1=Vref−ΔV2+ΔV1). The transmission voltage VTx may have a waveform such that the first voltage difference ΔV1 is added to the second and third voltages V2 and V3, respectively The second and third voltages V2 and V3 may be alternately applied during a frame which is a unit time period for displaying an image to have equal magnitudes and opposite potentials with respect to the reference voltage Vref. In addition, the fourth and fifth voltages V4 and V5 may be applied during a partial time period of a frame. For example, each of the fourth and fifth voltages V4 and V5 may be applied during a time period of about 1/1000 to about 1/10000 of a single frame. Further, each of the fourth and fifth voltages V4 and V5 may be applied periodically with a frequency of about 100 Hz to about 100 kHz. The reception voltage VRx may be the reference voltage Vref.

As a result, one of the second and third voltages V2 and V3 is applied to the first electrode 238 during most of a single frame, and one of the fourth and fifth voltages V4 and V5 is applied to the first electrode 238 during the other partial time period of the single frame. Since an electric field is generated between the first and second electrodes 238 and 240 due to the second voltage difference ΔV2 during the most of the single frame, a light from the display panel 220 having a first polarization state where a polarization axis is parallel to the plane of the paper (i.e., a cross-sectional plane) may have no retardation while passing through the polarization control liquid crystal layer 236. Accordingly, after the light passes through the polarization control liquid crystal layer 236, the light may still have the first polarization state and may enter the lens panel 250.

Since the liquid crystal molecule 256a of the lens liquid crystal layer 256 has a long axis parallel to the plane of the paper, the light of the first polarization state may feel that the lens liquid crystal layer 256 has the extraordinary refractive index $n_e$. As a result, the light of the first polarization state may feel a refractive index difference at an interface between the lens liquid crystal layer 256 and the second lens substrate 254. Accordingly, the light of the first polarization state may be refracted while passing through the lens panel 250 so that the switchable touch display device 210 can display the 3D image.

Further, since the transmission voltage VTx of the fourth and fifth voltages V4 and V5 and the reception voltage VRx of the reference voltage Vref are applied to the first and second electrodes 238 and 240, respectively, a capacitor is constituted between the first and second electrodes 238 and 240 due to a sum ($\Delta V1+\Delta V2$) of the first and second voltage differences $\Delta V1$ and $\Delta V2$ or a difference ($\Delta V1-\Delta V2$) between the first and second voltage differences $\Delta V1$ and $\Delta V2$. Since a capacitance of the capacitor between the first and second electrodes 238 and 240 changes according to a touch or not, the touch position may be detected by measuring a change in capacitance.

In the switchable touch display device 210 according to the second embodiment, the 2D image is displayed when the first and second electrodes 238 and 240 have no voltage difference, and the 3D image is displayed when the first and second electrodes 238 and 240 have a voltage difference. In another embodiment, the 3D image may be displayed when the first and second electrodes 238 and 240 have no voltage difference, and the 2D image may be displayed when the first and second electrodes 238 and 240 have a voltage difference by adjusting an alignment direction of the lens liquid crystal layer 256 of the lens panel 250 and adjusting a refractive index of the second lens substrate 254 of the lens panel 250.

Although the constant reference voltage Vref is applied to the second electrode 240 in the switchable type touch display device 210 according to the second embodiment, a partial 2D/3D image may be displayed by applying a variable voltage to the second electrode in another embodiment.

Figure 7A:
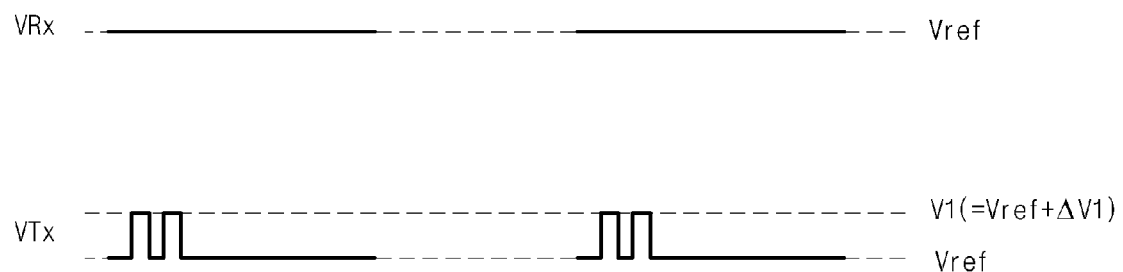
FIGS. 7A and 7B are timing charts showing signals used for displaying a 2D image and a 3D image, respectively, in a switchable touch display device according to a third embodiment of the present invention.
Figure 7B:
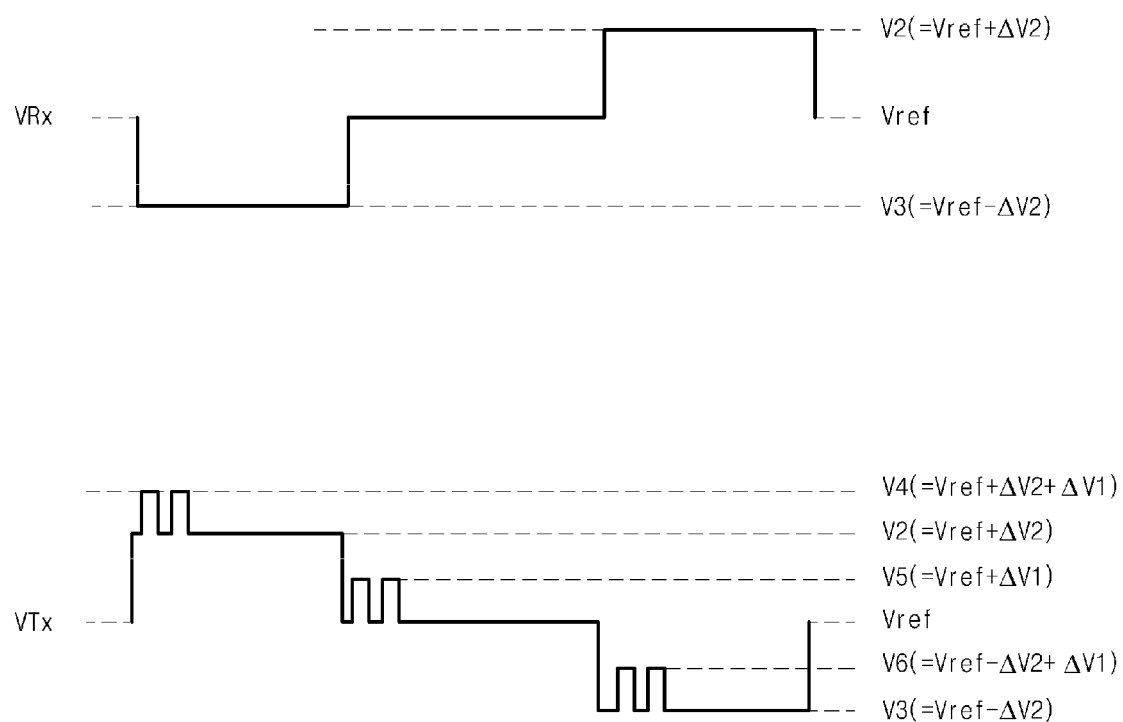

FIGS. 7A and 7B are timing charts showing signals used for displaying a 2D image and a 3D image, respectively, in a switchable touch display device according to a third embodiment of the present invention. The switchable touch display device according to a third embodiment has the same structure as the switchable touch display device of FIG. 5.

In FIGS. 5, 7A and 7B, a transmission voltage VTx and a reception voltage VRx are applied to the first and second electrodes 238 and 240, respectively, of the touch polarization control panel 230 of the switchable touch display device 210.

As shown in FIGS. 5 and 7A, when the touch display device 210 displays the 2D image, the transmission voltage VTx may be one of a reference voltage Vref and a first voltage V1 for detecting a touch. The first voltage V1 may have a square wave which is greater than the reference voltage Vref by a first voltage difference $\Delta V1$ (V1=Vref+$\Delta V1$). The transmission voltage VTx may have a waveform such that the first voltage difference $\Delta V1$ is added to the reference voltage Vref.

The first voltage V1 may be applied during a partial time period of a frame which is a unit time period for displaying an image. For example, the first voltage V1 may be applied during a time period of about 1/1000 to about 1/10000 of a single frame. In addition, the first voltage V1 may be applied periodically with a frequency of about 100 Hz to about 100 kHz. The reception voltage VRx may be the reference voltage Vref.

As a result, the reference voltage Vref is applied to the first electrode 238 during most of a single frame, and the first voltage V1 is applied to the first electrode 238 during the other partial time period of the single frame. Since an electric field is not generated between the first and second electrodes 238 and 240 during the most of the single frame, a light from the display panel 220 having a first polarization state where a polarization axis is parallel to the plane of the paper (i.e., a cross-sectional plane) may have a retardation of 212 (half wave) while passing through the polarization control liquid crystal layer 236. Accordingly, after the light passes through the polarization control liquid crystal layer 236, the light may have a second polarization state where a polarization axis is perpendicular to the plane of the paper and may enter the lens panel 250.

Since the liquid crystal molecule 256a of the lens liquid crystal layer 256 has a long axis parallel to the plane of the paper, the light of the second polarization state may feel that the lens liquid crystal layer 256 has the ordinary refractive index $n_o$. As a result, the light of the second polarization state may feel no refractive index difference at an interface between the lens liquid crystal layer 256 and the second lens substrate 254. Accordingly, the light of the second polarization state may straightly pass through the lens panel 250 without refraction so that the switchable touch display device 210 can display the 2D image.

Further, since the transmission voltage VTx of the first voltage V1 and the reception voltage VRx of the reference voltage Vref are applied to the first and second electrodes 238 and 240, respectively, a capacitor is constituted between the first and second electrodes 238 and 240 due to the first voltage difference $\Delta V1$. Since a capacitance of the capacitor between the first and second electrodes 238 and 240 changes according to a touch or not, the touch position may be detected by measuring a change in capacitance.

As shown in FIGS. 5 and 7B, when the touch display device 210 partially displays the 2D image and the 3D image, the transmission voltage VTx may be one of the reference voltage Vref, second and third voltages V2 and V3 for controlling polarization and fourth to sixth voltages V4 to V6 for detecting a touch. The second voltage V2 may have a square wave which is greater than the reference voltage Vref by a second voltage difference $\Delta V2$ (V2=Vref+$\Delta V2$) and the third voltage V3 may have a square wave which is smaller than the reference voltage Vref by the second voltage difference $\Delta V2$ (V3=Vref−$\Delta V2$) In addition, the fourth voltage V4 may have a square wave which is greater than the second voltage V2 by the first voltage difference $\Delta V1$ (V4=V2+$\Delta V1$=Vref+$\Delta V2$+$\Delta V1$), the fifth voltage may have a square wave which is greater than the reference voltage Vref by the first voltage difference $\Delta V1$ (V5=Vref+$\Delta V1$) and the sixth voltage V6 may have a square wave which is greater than the third voltage V3 by the first voltage difference $\Delta V1$ (V6=V3+$\Delta V1$=Vref−$\Delta V2$+$\Delta V1$). The transmission voltage VTx may have a waveform such that the fourth, fifth and sixth voltages V4, V5 and V6 are added to the second voltage V2, the reference voltage Vref and the third voltage V3, respectively.

The reference voltage Vref may be applied to the first electrode 238 corresponding to a first portion displaying the 2D image, and one of the reference voltage Vref, the second voltage V2 and the third voltage V3 may be applied to the first electrode 238 corresponding to a second portion displaying the 3D image.

The second and third voltages V2 and V3 may be alternately applied during a frame which is a unit time period for displaying an image to have equal magnitudes and opposite potentials with respect to the reference voltage Vref. In addition, the fourth, fifth and sixth voltages V4, V5 and V6 may be applied during a partial time period of a frame. For example, each of the fourth, fifth and sixth voltages V4, V5 and V6 may be applied during a time period of about 1/1000 to about 1/10000 of a single frame. Further, each of the fourth, fifth and sixth voltages V4, V5 and V6 may be applied periodically with a frequency of about 100 Hz to about 100 kHz.

The reception voltage VRx may be one of the reference voltage Vref, the second voltage V2 and the third voltage V3 during a frame. The reference voltage Vref may be applied to the second electrode 240 corresponding to the first portion displaying the 2D image, and one of the reference voltage Vref, the second voltage V2 and the third voltage V3 may be applied to the second electrode 240 corresponding to the second portion displaying the 3D image.

In the switchable type touch display device 210, the first portion may display the 2D image when a voltage difference between the first and second electrodes 238 and 240 in the first portion is smaller than the second voltage difference $\Delta V2$, and the second portion may display the 3D image when the voltage difference between the first and second electrodes 238 and 240 in the second portion is equal to or greater than the second voltage difference $\Delta V2$.

For example, when the first portion displays the 2D image, the reference voltage Vref may be applied to the first and second 238 and 240 in the first portion such that the voltage difference between the first and second electrodes 238 and 240 in the first portion is about 0.

When the second portion displays the 3D image, one of the reference voltage Vref, the second voltage V2 and the third voltage V3 may be applied to each of the first and second electrodes 238 and 240 in the second portion. For example, the reference voltage Vref may be applied to the first electrode 238 and one of the second and third voltages V2 and V3 may be applied to the second electrode 240 such that the voltage difference between the first and second electrodes 238 and 240 in the second portion is the second voltage difference $\Delta V2$. In addition, the second voltage V2 may be applied to the first electrode 238 and one of the reference voltage Vref and the third voltage V3 may be applied to the second electrode 240 such that the voltage difference between the first and second electrodes 238 and 240 in the second portion is one of the second voltage difference $\Delta V2$ and twice of the second voltage difference $\Delta V2$. Further, the third voltage V3 may be applied to the first electrode 238 and one of the reference voltage Vref and the second voltage V2 may be applied to the second electrode 240 such that the voltage difference between the first and second electrodes 238 and 240 in the second portion is one of the second voltage difference $\Delta V2$ and twice (2$\Delta V2$) of the second voltage difference $\Delta V2$.

As a result, for displaying the 3D image, one of the reference voltage Vref, the second voltage V2 and the third voltage V3 is applied to the first electrode 238 during most of a single frame, and one of the fourth, fifth and sixth voltages V4, V5 and V6 are applied to the first electrode 238 during the other partial time period of the single frame. Since an electric field is generated between the first and second electrodes 238 and 240 due to the voltage difference equal to or greater than the second voltage difference $\Delta V2$ during the most of the single frame, a light from the display panel 220 having a first polarization state where a polarization axis is parallel to the plane of the paper (i.e., a cross-sectional plane) may have no retardation while passing through the polarization control liquid crystal layer 236. Accordingly, after the light passes through the polarization control liquid crystal layer 236, the light may still have the first polarization state and may enter the lens panel 250.

Since the liquid crystal molecule 256a of the lens liquid crystal layer 256 has a long axis parallel to the plane of the paper, the light of the first polarization state may feel that the lens liquid crystal layer 256 has the extraordinary refractive index $n_e$. As a result, the light of the first polarization state may feel a refractive index difference at an interface between the lens liquid crystal layer 256 and the second lens substrate 254. Accordingly, the light of the first polarization state may be refracted while passing through the lens panel 250 so that the switchable touch display device 210 can display the 3D image.

Further, since the transmission voltage VTx of the fourth, fifth and sixth voltages V4, V5 and V6 and the reception voltage VRx of the reference voltage Vref are applied to the first and second electrodes 238 and 240, respectively, a capacitor is constituted between the first and second electrodes 238 and 240 due to a sum ($\Delta V1+\Delta V2$) of the first and second voltage differences $\Delta V1$ and $\Delta V2$ or a sum ($\Delta V1+2\Delta V2$) of the first voltage difference $\Delta V1$ and twice (2$\Delta V2$) of the second voltage difference $\Delta V2$. Since a capacitance of the capacitor between the first and second electrodes 238 and 240 changes according to a touch or not, the touch position may be detected by measuring a change in capacitance.

In the switchable touch display device 210 according to the third embodiment, the 2D image is displayed when the first and second electrodes 238 and 240 have no voltage difference, and the 3D image is displayed when the first and second electrodes 238 and 240 have a voltage difference. In another embodiment, the 3D image may be displayed when the first and second electrodes 238 and 240 have no voltage difference, and the 2D image may be displayed when the first and second electrodes 238 and 240 have a voltage difference by adjusting an alignment direction of the lens liquid crystal layer 256 of the lens panel 250 and adjusting a refractive index of the second lens substrate 254 of the lens panel 250.

Figure 8:
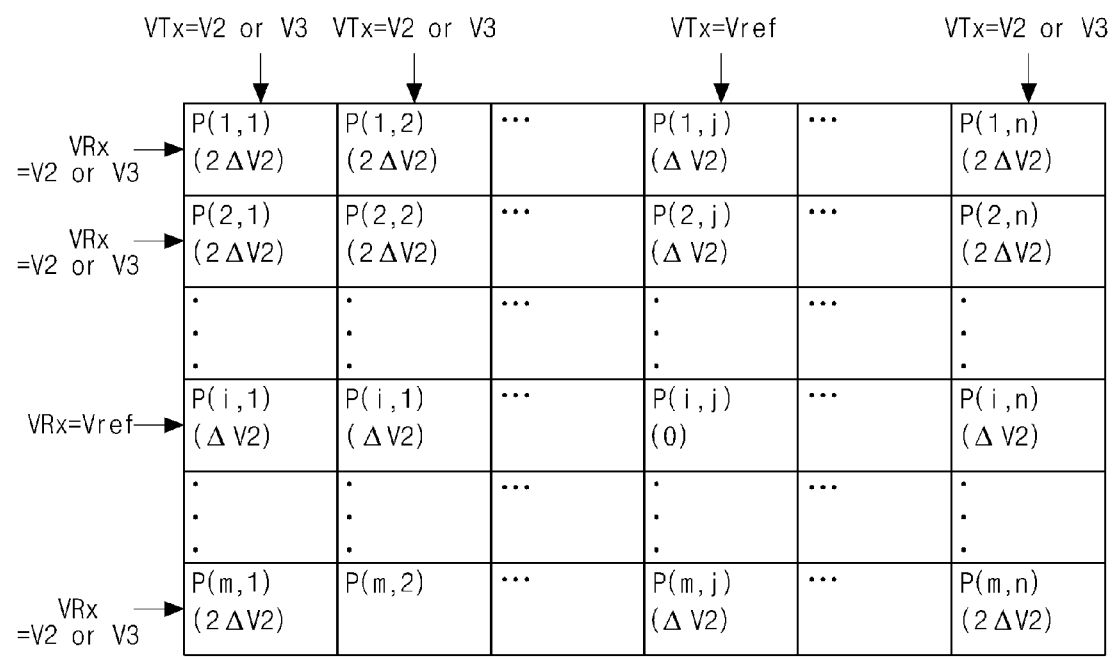
FIG. 8 is a plan view showing a switchable touch display device according to a third embodiment of the present invention.

FIG. 8 is a plan view showing a switchable touch display device according to a third embodiment of the present invention.

In FIGS. 5 and 8, a switchable type touch display device 210 includes a plurality of pixels P(1, 1) to P(m, n) which are defined by first and second electrodes 238 and 240 crossing each other. The switchable type touch display device 210 may partially display a 2D image and a 3D image by applying one of a reference voltage Vref, a second voltage V2 and a third voltage V3 to the first and second electrodes 238 and 240. For example, a transmission voltage VTx of the reference voltage Vref may be applied to the first electrode 238 corresponding to the pixels P(1, j) to P(m, j) of the jth column and the transmission voltage VTx of one of the second and third voltages V2 and V3 may be applied to the first electrode 238 corresponding to the other pixels.

In addition, a reception voltage VRx of the reference voltage Vref may be applied to the second electrode 240 corresponding to the pixels P(i, 1) to P(i, n) of ith row and the reception voltage VRx of one of the second and third voltages V2 and V3 may be applied to the second electrode 240 corresponding to the other pixels. As a result, a voltage difference between the first and second electrodes 238 and 240 corresponding to the pixel P(i, j) of the ith row and the jth column may be about 0 such that the pixel P(i, j) of the ith row and the jth column displays the 2D image, and a voltage difference between the first and second electrodes 238 and 240 corresponding to the other pixels may be one of a second voltage difference ΔV2 and twice (2ΔV2) of the second voltage difference ΔV2 such that the other pixels display the 3D image.

In another embodiment, the plurality of bars for the first and second electrodes may have difference widths and voltages for controlling polarization and detecting touch may be independently applied to the first and second electrodes.

Figure 9:
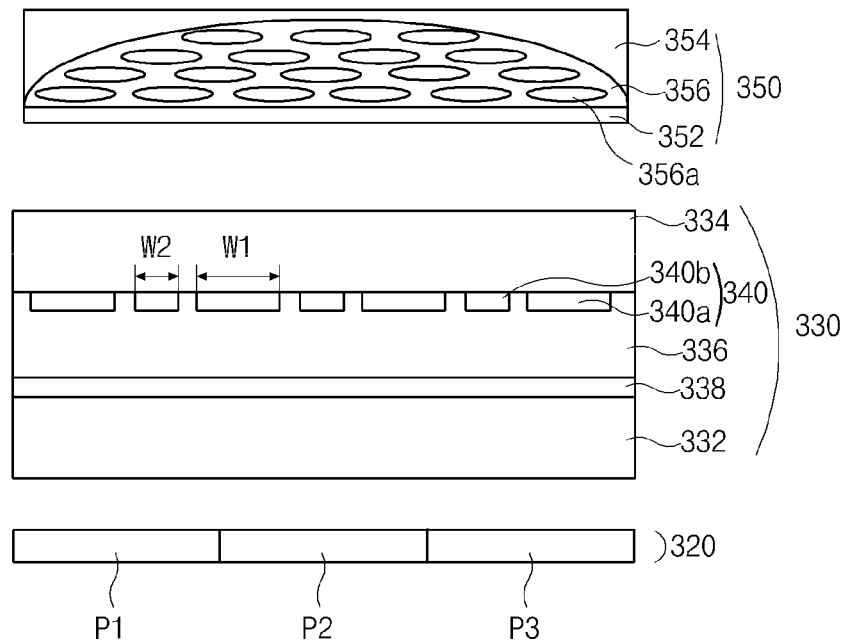
FIG. 9 is a cross-sectional view showing a switchable type touch display device according to a fourth embodiment of the present invention.

FIG. 9 is a cross-sectional view showing a switchable type touch display device according to a fourth embodiment of the present invention.

In FIG. 9, a switchable type touch display device 310 according to a fourth embodiment of the present invention includes a display panel 320, a touch polarization control panel 330 and a lens panel 350. The display panel 320 displays an image using a plurality of pixels including first to third pixels P1 to P3 and the plurality of pixels may be classified into a plurality of groups corresponding to a plurality of viewing zones. When a two-dimensional (2D) image is displayed by the switchable touch display device 310, the plurality of pixels of each group may display a single image. In addition, when a three-dimensional (3D) image is displayed by the switchable type touch display device 210, the plurality of pixels of each group may display a partial image constituting a single image.

The touch polarization control panel 330 selectively maintains or changes a polarization state of a light emitted from the display panel 320. The touch polarization control panel 330 may include first and second touch polarization control substrates 332 and 334 facing and spaced apart from each other and a polarization control liquid crystal layer 336 interposed between the first and second touch polarization control substrates 332 and 334.

First and second electrodes 338 and 340 are formed on inner surfaces of the first and second touch polarization control substrate 332 and 334, respectively. The first electrode 338 may include a plurality of first polarization control electrodes (not shown) and a plurality of first touch electrodes (not shown) which are parallel to and spaced apart from each other. The plurality of first polarization control electrodes and the plurality of first touch electrodes are alternately disposed and have a shape of a plurality of bars. The second electrode 340 may include a plurality of second polarization control electrodes 340a and a plurality of second touch electrodes 340b which are parallel to and spaced apart from each other. The plurality of second polarization control electrodes 340a and the plurality of second touch electrodes 340b are alternately disposed and have a shape of a plurality of bars. The plurality of first polarization control electrodes and the plurality of first touch electrodes may have different widths, and the plurality of second polarization control electrodes 340a and the plurality of second touch electrodes 340b may have different widths.

For example, each of the plurality of second polarization control electrodes 340a may have a first width w1 and each of the plurality of second touch electrodes 340b may have a second width w2 smaller than the first width w1.

In addition, the plurality of first polarization control electrodes and the plurality of first touch electrodes may cross the plurality of second polarization control electrodes 340a and the plurality of second touch electrodes 340b to constitute a capacitor.

The lens panel 350 refracts or straightly transmits the light passing through the touch polarization control panel 330 according to the polarization state of the light. The lens panel 350 may include first and second lens substrates 352 and 354 facing each other and a lens liquid crystal layer 356 interposed between the first and second lens substrates 352 and 354. A plurality of concave portions each having a half cylindrical shape may be formed on an inner surface of the second lens substrate 354 and may be filled with the lens liquid crystal layer 356.

In addition, a plurality of liquid crystal molecules 356a of the lens liquid crystal layer 356 may be arranged such that a long axis of the liquid crystal molecule 356a is parallel to the plane of the paper (i.e., the cross-sectional plane). The liquid crystal molecule 356a may have a birefringence property such that the liquid crystal molecule 356a has an ordinary refractive index $n_o$ and an extraordinary refractive index $n_o$ according to a propagation direction of light. Further, the second lens substrate 354 may include a material having a refractive index the same as the ordinary refractive index $n_o$ of the liquid crystal molecule 356a.

In another embodiment, the long axis of the liquid crystal molecule 356a may be disposed to be perpendicular to the plane of the paper, and the second lens substrate 354 may include a material having a refractive index the same as the extraordinary refractive index $n_o$ of the liquid crystal molecule 356a.

The switchable touch display device 310 may selectively display one of a 2D image and a 3D image according to a polarization state of the touch polarization control panel 330 and may detect a touch position from a change in capacitance between the first and second electrodes 338 and 340 generated according to a touch or not in a state where voltages are applied to the first and second electrodes 338 and 340 of the touch polarization control panel 330.

A method of driving the switchable touch display device 310 will be illustrated with reference to drawings.

Figure 10:
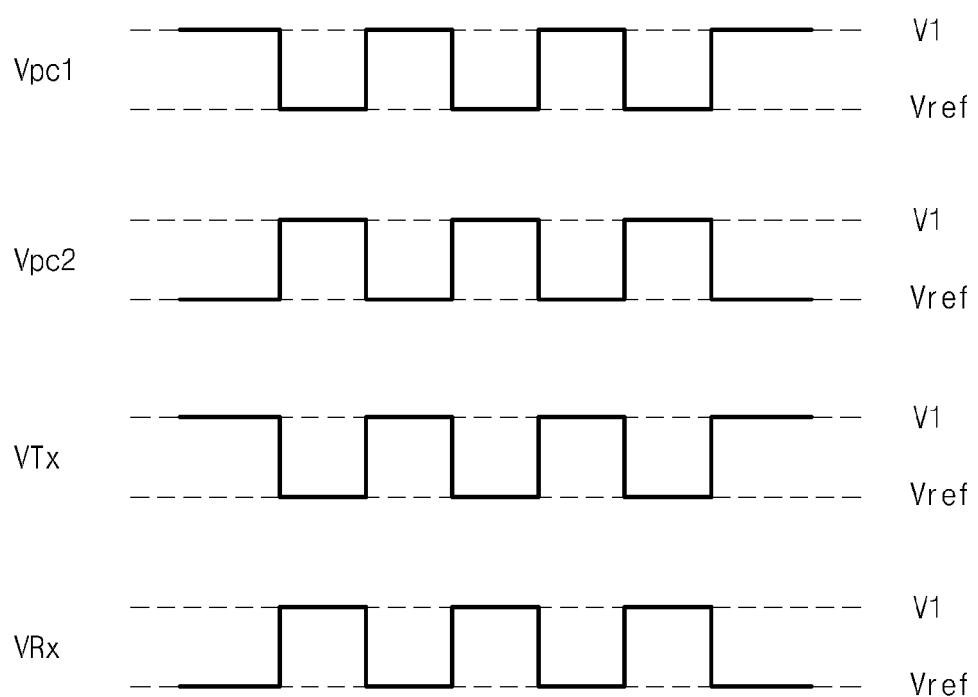
FIG. 10 is a timing charts showing signals used for displaying a 2D image and a 3D image in a switchable touch display device according to a fourth embodiment of the present invention.

FIG. 10 is a timing charts showing signals used for displaying a 2D image and a 3D image in a switchable touch display device according to a fourth embodiment of the present invention.

In FIGS. 9 and 10, a first polarization control voltage Vpc1 is applied to the plurality of first polarization control electrodes of the first electrode 338 of the touch polarization control panel 330 of the switchable touch display device 310, and a transmission voltage VTx is applied to the plurality of first touch electrodes of the first electrode 338 of the touch polarization control panel 330 of the switchable touch display device 310. In addition, a second polarization control voltage Vpc2 is applied to the plurality of second polarization control electrodes 340a of the second electrode 340 of the touch polarization control panel 330 of the switchable touch display device 310, and a reception voltage VRx is applied to the plurality of second touch electrodes 340b of the second electrode 340 of the touch polarization control panel 330 of the switchable touch display device 310. The first polarization control voltage Vpc1 and the transmission voltage VTx have the same magnitude as each other, and the second polarization control voltage Vpc2 and the reception voltage VRx have the same magnitude as each other.

Further, the first and second polarization control voltages Vpc1 and Vpc2 have the different magnitude from each other and the transmission voltage VTx and the reception voltage VRx have the different magnitude from each other, thereby an electric field generated between the first and second electrodes 338 and 340.

For example, the first polarization control voltage Vpc1 may alternately have the reference voltage Vref and a first voltage V1 greater than the reference voltage Vref, and the second polarization control voltage Vpc2 may alternately have the first voltage V1 and the reference voltage Vref. In addition, the transmission voltage VTx may alternately have the reference voltage Vref and the first voltage V1, and the reception voltage VRx may alternately have the first voltage V1 and the reference voltage Vref. The first polarization control voltage Vpc1, the second polarization control voltage Vpc2, the transmission voltage VTx and the reception voltage VRx may have the same frequency as each other.

As a result, the electric field is generated between the first and second electrodes 338 and 340, and a light from the display panel 320 having a first polarization state where a polarization axis is parallel to the plane of the paper (i.e., a cross-sectional plane) may have no retardation while passing through the polarization control liquid crystal layer 336. Accordingly, after the light passes through the polarization control liquid crystal layer 336, the light may still have the first polarization state and may enter the lens panel 350.

Since the liquid crystal molecule 356a of the lens liquid crystal layer 356 has a long axis parallel to the plane of the paper, the light of the first polarization state may feel that the lens liquid crystal layer 356 has the extraordinary refractive index $n_e$. As a result, the light of the first polarization state may feel a refractive index difference at an interface between the lens liquid crystal layer 356 and the second lens substrate 354. Accordingly, the light of the first polarization state may be refracted while passing through the lens panel 350.

The plurality of pixels of each group corresponding to each viewing zone may display a single image when the switchable type touch display device 310 displays a 2D image, and the plurality of pixels of each group corresponding to each viewing zone may display a partial image constituting a single image when the switchable type touch display device 310 displays a 3D image. Although the plurality of pixels of the different groups of the display panel 320 display the single image toward the different viewing zones by the touch polarization control panel 330 and the lens panel 350 when the switchable type touch display device 310 displays a 2D image, a user may recognize the 2D image because the plurality of pixels of the different groups display the same image.

A viewing zone overlap structure which may be adopted to compensate brightness reduction at the border between the adjacent viewing zones will be illustrated with reference to a drawing.

Figure 11:
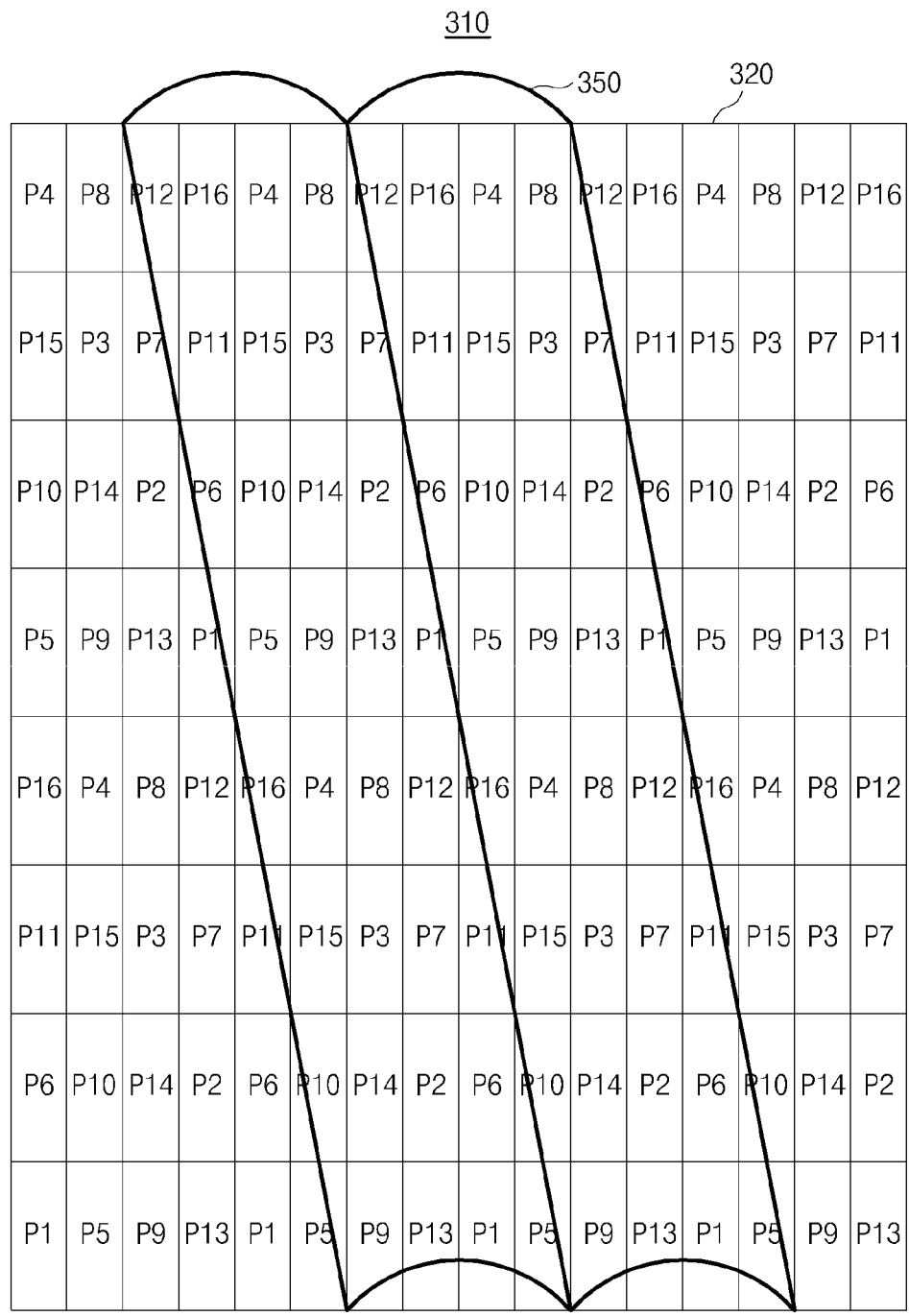
FIG. 11 is a plan view showing a display panel and a lens panel of a switchable type touch display device according to a fifth embodiment of the present invention.

FIG. 11 is a plan view showing a display panel and a lens panel of a switchable type touch display device according to a fifth embodiment of the present invention. The switchable touch display device according to a fifth embodiment has the same structure as the switchable touch display device of FIG. 9.

In FIGS. 9 and 11, the display panel 320 of the switchable type touch display device 310 includes first to sixteenth pixels P1 to P16 which display a plurality of partial images corresponding to a plurality of viewing zones. In addition, the lens panel 350 of the switchable type touch display device 310 is disposed such that the plurality of concave portions slant with respect to a vertical pixel line of the display panel 320.

As a result, four partial images are displayed at a single viewing zone and brightness reduction at the border between adjacent viewing zones is compensated. For example, the partial image of the first pixel P1 may be displayed together with the partial images of the sixth, seventh and twelfth pixels P6, P7 and P12, and the partial image of the fifth pixel P5 may be displayed together with the partial images of the tenth, eleventh and sixteenth pixels P10, P11 and P16.

Consequently, in the switchable type touch display device according to the present disclosure, total thickness decreases and fabrication cost is reduced by forming an electrode for touch on a polarization control panel. In addition, power consumption is reduced and a partial 2D/3D display is obtained by forming an electrode for touch on a polarization control panel.

It will be apparent to those skilled in the art that various modifications and variations can be made in a switchable type touch display device and a method of driving the switchable type touch display device of the present disclosure without departing from the sprit or scope of the invention. Thus, it is intended that the present invention covers the modifications and variations of this invention provided they come within the scope of the appended claims and their equivalents.

What is claimed is:

1. A switchable type touch display device, comprising:
   a display panel displaying an image;
   a touch polarization control panel over the display panel, wherein the touch polarization control panel comprises:
   first and second touch polarization control substrates facing and spaced apart from each other;
   a first electrode on an inner surface of the first touch polarization control substrate, the first electrode having a shape of a plurality of bars parallel to and spaced apart from each other;
   a second electrode on an inner surface of the second touch polarization control substrate, the second electrode having a shape of a plurality of bars parallel to and spaced apart from each other, and the second electrode crossing the first electrode; and
   a polarization control liquid crystal layer between the first and second touch polarization control substrates, wherein light from the display panel has a retardation of one of $\lambda/2$ and 0 while passing through the polarization control liquid crystal layer according to voltages applied to the first and second electrodes; and
   a lens panel over the touch polarization control panel, wherein the lens panel refracts or straightly transmits a light passing through the touch polarization control panel according to a polarization state of the light, wherein the lens panel comprises:
   first and second lens substrates facing and spaced apart from each other; and
   a lens liquid crystal layer between the first and second lens substrates,
   wherein the second lens substrate includes a plurality of concave portions each having a half cylindrical shape on an inner surface thereof,
   wherein a long axis of a liquid crystal molecule of the lens liquid crystal layer is perpendicular to an axis of the half cylindrical shape, and wherein a refractive index of the second lens substrate is the same as an ordinary refractive index of the liquid crystal molecule of the lens liquid crystal layer.

2. The switchable type touch display device according to claim 1, wherein the plurality of bars of the first electrode have the same width as each other and the plurality of bars of the second electrode have the same width as each other, wherein a transmission voltage and a reception voltage are applied to the first and second electrodes, respectively, and wherein the transmission voltage is one of a first voltage for detecting a touch and a reference voltage and the reception voltage is the reference voltage when the switchable type touch display device displays a two-dimensional image.

3. The switchable type touch display device according to claim 2, wherein the first voltage has a square wave greater than the reference voltage by a first voltage difference, and the first voltage is applied during a time period of about $1/1000$ to about $1/10000$ of a single frame which is a unit time period for displaying an image.

4. The switchable type touch display device according to claim 1, wherein the plurality of bars of the first electrode have the same width as each other and the plurality of bars of the second electrode have the same width as each other, wherein a transmission voltage and a reception voltage are applied to the first and second electrodes, respectively, and wherein the transmission voltage is one of second and third voltages for controlling polarization and fourth and fifth voltages for detecting a touch and the reception voltage is the reference voltage when the switchable type touch display device displays a three-dimensional image.

5. The switchable type touch display device according to claim 4, wherein the second voltage has a square wave greater than the reference voltage by a second voltage difference, wherein the third voltage has a square wave smaller than the reference voltage by the second voltage difference, wherein the fourth voltage has a square wave greater than the second voltage by a first voltage difference, wherein the fifth voltage has a square wave greater than the third voltage by the first voltage difference, and wherein the fourth and fifth voltages are applied during a time period of about $1/1000$ to about $1/10000$ of a single frame which is a unit time period for displaying an image.

6. The switchable type touch display device according to claim 1, wherein the plurality of bars of the first electrode have the same width as each other and the plurality of bars of the second electrode have the same width as each other, wherein a transmission voltage and a reception voltage are applied to the first and second electrodes, respectively, and wherein the transmission voltage is one of the transmission voltage, second and third voltages for controlling polarization and fourth to sixth voltages for detecting a touch and the reception voltage is one of the reference voltage and the second and third voltages when the switchable type touch display device displays a three-dimensional image.

7. The switchable type touch display device according to claim 6, wherein the second voltage has a square wave greater than the reference voltage by a second voltage difference, wherein the third voltage has a square wave smaller than the reference voltage by the second voltage difference, wherein the fourth voltage has a square wave greater than the second voltage by a first voltage difference, wherein the fifth voltage has a square wave greater than the reference voltage by the first voltage difference, wherein the sixth voltage has a square wave greater than the third voltage by the first voltage difference, and wherein the fourth to sixth voltages are applied during a time period of about $1/1000$ to about $1/10000$ of a single frame which is a unit time period for displaying an image.

8. The switchable type touch display device according to claim 6, wherein the plurality of concave portions are slanted with respect to a vertical pixel line of the display panel.

9. The switchable type touch display device according to claim 1, wherein the first electrode includes a plurality of first polarization control electrodes and a plurality of first touch electrodes having different widths from each other, wherein the second electrode includes a plurality of second polarization control electrodes and a plurality of second touch electrodes having different widths from each other, wherein a first polarization control voltage and a transmission voltage are applied to the plurality of first polarization control electrodes and the plurality of first touch electrodes, respectively, wherein a second polarization control voltage and a reception voltage are applied to the plurality of second polarization control electrodes and the plurality of second touch electrodes, respectively, wherein the first polarization control voltage and the transmission voltage have the same magnitude as each other, and wherein the second polarization voltage and the reception voltage have the same magnitude as each other.

10. The switchable type touch display device according to claim 9, wherein a plurality of pixels of each of a plurality of groups corresponding to a plurality of viewing zones display a single image when the switchable type touch display device displays a two-dimensional image, and wherein the plurality of pixels of each of the plurality of groups corresponding to the plurality of viewing zones display a partial image constituting the single image when the switchable type touch display device displays a three-dimensional image.

11. The switchable type touch display device according to claim 9, wherein a width of each of the plurality of second polarization control electrodes is greater than a width of each of the plurality of second touch electrodes.

12. The switchable type touch display device according to claim 1, wherein the first electrode includes a plurality of first polarization control electrodes and a plurality of first touch electrodes having different widths from each other, wherein the second electrode includes a plurality of second polarization control electrodes and a plurality of second touch electrodes having different widths from each other, wherein a first polarization control voltage and a transmission voltage are applied to the plurality of first polarization control electrodes and the plurality of first touch electrodes, respectively, wherein a second polarization control voltage and a reception voltage are applied to the plurality of second polarization control electrodes and the plurality of second touch electrodes, respectively, wherein the first polarization control voltage and the transmission voltage have the same magnitude as each other, and wherein the second polarization voltage and the reception voltage have the same magnitude as each other.

13. A switchable type touch display device, comprising:
a display panel displaying an image;
a touch polarization control panel over the display panel, wherein the touch polarization control panel comprises:
first and second touch polarization control substrates facing and spaced apart from each other;
a first electrode on an inner surface of the first touch polarization control substrate, the first electrode having a shape of a plurality of bars parallel to and spaced apart from each other;

a second electrode on an inner surface of the second touch polarization control substrate, the second electrode having a shape of a plurality of bars parallel to and spaced apart from each other, and the second electrode crossing the first electrode; and a polarization control liquid crystal layer between the first and second touch polarization control substrates, wherein light from the display panel has a retardation of one of $\lambda/2$ and 0 while passing through the polarization control liquid crystal layer according to voltages applied to the first and second electrodes; and a lens panel over the touch polarization control panel, wherein the lens panel refracts or straightly transmits a light passing through the touch polarization control panel according to a polarization state of the light, wherein the lens panel comprises:

first and second lens substrates facing and spaced apart from each other; and a lens liquid crystal layer between the first and second lens substrates, wherein the second lens substrate includes a plurality of concave portions each having a half cylindrical shape on an inner surface thereof, wherein a long axis of a liquid crystal molecule of the lens liquid crystal layer is parallel to an axis of the half cylindrical shape, and wherein a refractive index of the second lens substrate is the same as an extraordinary refractive index of the liquid crystal molecule of the lens liquid crystal layer.

14. The switchable type touch display device according to claim 13, wherein the plurality of bars of the first electrode have the same width as each other and the plurality of bars of the second electrode have the same width as each other, wherein a transmission voltage and a reception voltage are applied to the first and second electrodes, respectively, and wherein the transmission voltage is one of a first voltage for detecting a touch and a reference voltage and the reception voltage is the reference voltage when the switchable type touch display device displays a two-dimensional image.

15. The switchable type touch display device according to claim 13, wherein the plurality of bars of the first electrode have the same width as each other and the plurality of bars of the second electrode have the same width as each other, wherein a transmission voltage and a reception voltage are applied to the first and second electrodes, respectively, and wherein the transmission voltage is one of second and third voltages for controlling polarization and fourth and fifth voltages for detecting a touch and the reception voltage is the reference voltage when the switchable type touch display device displays a three-dimensional image.

16. The switchable type touch display device according to claim 13, wherein the plurality of bars of the first electrode have the same width as each other and the plurality of bars of the second electrode have the same width as each other, wherein a transmission voltage and a reception voltage are applied to the first and second electrodes, respectively, and wherein the transmission voltage is one of the transmission voltage, second and third voltages for controlling polarization and fourth to sixth voltages for detecting a touch and the reception voltage is one of the reference voltage and the second and third voltages when the switchable type touch display device displays a three-dimensional image.

17. The switchable type touch display device according to claim 16, wherein the plurality of concave portions are disposed slant with respect to a vertical pixel line of the display panel.

\* \* \* \* \*